United States Patent [19]

Salmon et al.

[11] 4,280,600
[45] Jul. 28, 1981

[54] SELF-REFILLING HYDRAULIC ACTUATOR

[75] Inventors: John K. Salmon, South Windsor; Dwight Beazley, Newington, both of Conn.

[73] Assignee: Otis Elevator Company, Hartford, Conn.

[21] Appl. No.: 54,100

[22] Filed: Jul. 2, 1979

[51] Int. Cl.$^3$ ............................................... F16F 9/20
[52] U.S. Cl. ................................ 188/312; 188/315; 188/318
[58] Field of Search ............... 188/314, 315, 318, 322, 188/312

[56] References Cited

U.S. PATENT DOCUMENTS

| | | | |
|---|---|---|---|
| 404,012 | 5/1889 | Nickerson | 188/312 |
| 2,060,590 | 11/1936 | Padgett | 188/315 |
| 2,849,090 | 8/1958 | DeKoning et al. | 188/315 |
| 3,076,643 | 2/1963 | Bittel | 188/314 X |

*Primary Examiner*—Douglas C. Butler

*Attorney, Agent, or Firm*—Robert E. Greenstien

[57] ABSTRACT

A piston slides in a fluid-filled piston chamber for damping or snubbing the movement of an object connected thereto. Attached to the piston is a piston rod which is disposed in the main fluid supply reservoir located below the piston chamber, at the lowest point in the apparatus. As the piston moves, the associated movement of this rod in the reservoir varies its displacement therein, thereby displacing fluid into a vented secondary reservoir which is located above the piston chamber, at the highest point in the damper apparatus. Any leakage from the piston chamber collects in the reservoirs. Both reservoirs are in fluid supply connection with the piston chamber so that piston movement causes fluid to flow into the chamber from the reservoirs so as to keep the chamber completely filled with fluid at all times. Both reservoirs supply fluid to the piston rod seals, which are thereby always immersed in fluid.

1 Claim, 1 Drawing Figure

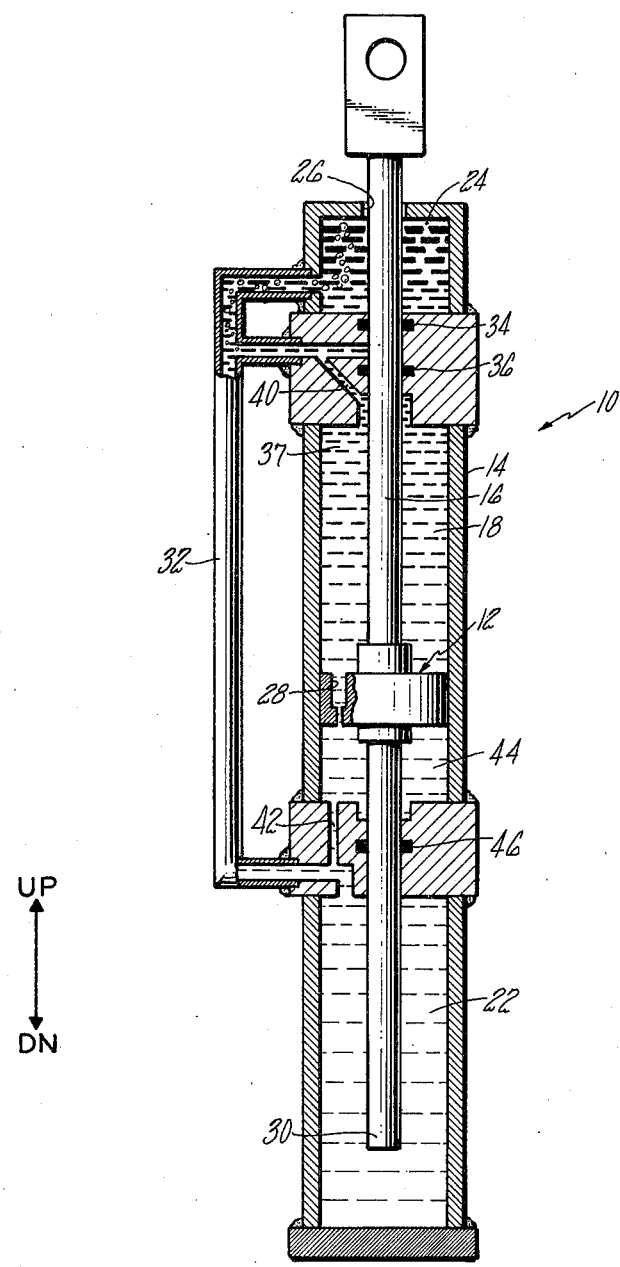

SELF-REFILLING HYDRAULIC ACTUATOR

BACKGROUND OF THE INVENTION

This invention relates to hydraulic cylinder arrangements, such as dashpots, shock absorbers, hydraulic actuators and the like.

In the typical hydraulic actuator or damper a piston slides within a cylinder which is filled with a fluid. When such an arrangement is utilized, as a dashpot or shock absorber, for example, the piston may be fitted with small orifices or passages through which the fluid flows so as to allow the piston to move within the cylinder at a controlled rate determined by the flow rate of the fluid through the orifices. In this way controlled motion or damping of an object connected to the piston through a piston rod is achieved. For reliable operation the piston must be completely immersed in fluid at all times, and the fluid should be substantially free of any air bubbles, since they can alter the flow rate through the orifices and thus produce uneven piston movement and damping action. This is also true for hydraulic actuators because any air in the fluid may decrease the maximum attainable fluid pressurization and thus decrease the actuator power output, mainly because air is compressible, whereas the fluid essentially is not.

In many hydraulic cylinder arrangements the fluid may gradually leak out of the cylinder, especially between the piston rod and the rod seals. The reason is that the seals sustain gradual wear and a small space, through which the fluid may leak, may develop between the seals and the piston rod, as a result. If fluid does leak from the cylinder, the piston may not be completely immersed in fluid throughout its entire range of movement within the cylinder, and uneven operation may result.

One prior art effort to alleviate this problem focuses on the use of two tandem piston rod seals. These are disposed in a chamber to which the fluid is supplied from a separate external reservoir in order to keep the inner seal, which is closest to the piston, well lubricated at all times in order to reduce its wear. Should this inner seal leak, fluid may enter the cylinder from the reservoir on piston depressurization strokes or it may leak from the cylinder, into the reservoir, on pressurization strokes. The outer seal serves to prevent leakage from the reservoir to the outside, but if it leaks, the reservoir will empty ultimately, in which case air will enter the cylinder.

Thus while such approaches are successful for extending cylinder operating life, they do not ameliorate the basic problem of fluid loss. Furthermore, since there is a possibility that the reservoir may empty completely, maintenance is required to ensure that adequate fluid supply is maintained in the reservoir at all times.

SUMMARY OF THE INVENTION

An object of the present invention is to provide a self-refilling hydraulic cylinder arrangement.

Another object is to provide for automatic removal of any air in the cylinder arrangement.

Other objects include preventing external fluid leakage from the cylinder and providing continuous piston seal lubrication.

In accordance with the present invention a fluid reservoir or supply is located at the lowest point in the cylinder. At the opposite end—the highest point is a second reservoir, which is vented to ambient and through which the piston rod extends. The second reservoir is filled with fluid, thereby bathing the piston rod seals in fluid. Any air in the fluid rises to the second reservoir, where it vents to the atmosphere. Movement of the piston is used to pump fluid between the main reservoir and the secondary reservoir to fill the low pressure side of the piston chamber as the piston moves; the cylinder is thereby completely filled at all times.

A feature of the invention is that any leakage past the piston rod seals simply enters the secondary reservoir, or the cylinder, thus eliminating any external leakage.

Another feature of the invention is that it may be utilized in hydraulic cylinder arrangements in which the piston rod extends through opposite ends of the cylinder, thus requiring the use of piston rod seals at each end of the cylinder. The two reservoirs may be discretely located at each end of the cylinder with the seals completely immersed in fluid at all times therein. Additionally, a piston rod end may extend into the main reservoir to pump fluid into the secondary reservoir when the rod displacement in the main reservoir increases on downward piston movement; when the piston rod moves in the opposite direction, upward, there is a reduction in displacement in the main reservoir and fluid flows from the secondary reservoir into the main reservoir. In this way, the main reservoir is completely filled with fluid at all times and the seal between the main reservoir and the chamber, like the seal between the secondary reservoir and the chamber, is immersed in fluid at all times, thereby significantly reducing its wear and extending its usable life.

Yet another feature of the invention is that any air bubbles in the fluid are automatically vented from the secondary reservoir.

Other objects, benefits and features of the instant invention may be apparent to one skilled in the art from the following detailed description, claims and drawing.

DESCRIPTION OF THE DRAWING

The drawing is a cross section of a shock absorber embodying the present invention.

DETAILED DESCRIPTION

A vertically oriented, self-refilling shock absorber or snubbing apparatus 10 embodying the present invention is illustrated in the drawing. In the apparatus 10 a piston 12 is slidably disposed in a cylinder 14. The piston is attached to a piston rod 16 and slides in a piston chamber 18. The chamber is completely filled with a fluid (i.e. hydraulic fluid). The cylinder contains a main fluid reservoir 22, which is located at its lowest point, and a secondary reservoir 24, which is located at the opposite end, the highest point. The main reservoir is completely filled with fluid while the secondary reservoir is partially filled. The secondary reservoir is vented to the ambient or atmosphere by means of a small vent space 26 located around the piston rod 16.

The piston 16 includes a number of passages or orifices 28 and these accommodate fluid flow through the piston at a controlled rate in order to damp or snub a moving object (not shown) which may be connected to the rod. The size of the orifices determines the flow rate which determines the damping force applied to the object. In some instances the passages may contain a check valve for providing unidirectional piston movement in the chamber. Such an arrangement exists in shock absorbers-lifters, for example. In these devices the piston is powered in one direction, for lifting an object, but in the opposite direction fluid pressure is maintained on the piston, to hold the object in place. However, if this pressure exceeds a certain level, the check valves open to allow the fluid to flow through the piston, which then moves at a controlled rate in the cylinder, thereby providing shock absorption.

The end 30 of the piston rod 16 is located in the main fluid reservoir 22. As the piston 12 moves downward, the resultant fluid displacement produced by the movement of the end 30 in the main reservoir forces fluid to the secondary reservoir 24 through a fluid supply line 32, thus raising the fluid level in the secondary reservoir. At the same time fluid from the main reservoir is pumped through the line 32 to piston rod seals 34, 36, which are thereby lubricated. The upper seal 34 prevents any sediment in the secondary reservoir from reaching the lower seal 36; this minimizes wear on the lower seal, thereby significantly extending its life; it also lessens the possibility that the fluid supply system will become clogged, in whole or in part, by sediment in the secondary reservoir, whereas the lower seal 36 prevents leakage from the piston chamber 18. The fluid pressure in the upper section 37 of the chamber 18 may be quite significant as the piston is pulled up; therefore, the fluid pressure on this seal may be substantial. Consequently, this seal is particularly conducive to leakage, and so it is important to maintain it in good operating conditions at all times in an effort to minimize the potential for leakage into the secondary reservoir from the central portion 18, since such leakage will decrease the fluid pressurization on an up stroke. However, even if such leakage occurs, the fluid simply flows into the fluid circulating system and, hence, is not lost.

Hence, any such leakage will simply produce a rise in the fluid level in the secondary reservoir. The reservoir and the chamber are connected through small weep holes 40, 42, which permit minute fluid flow between the reservoir and the chamber.

When the piston is not moving up or down, the head pressure in the secondary reservoir is greater than it is in any other portion of the circulating system; consequently, fluid may flow into the chamber through the weep holes. In this way any fluid that may have leaked out of the chamber, through the seals, during piston movement (chamber fluid pressurization) is replenished when the piston is at rest.

Any air bubbles in the upper section 37 of the chamber are vented through weep hole 40 into the secondary reservoir and from the secondary reservoir the air vents into the ambient through the space 26. Similarly, fluid flows into the central portion 18 through the weep hole 40 by gravity feed to purge out and replace the air. Thus the central portion or main chamber 18 is completely filled at all times.

The lower end of the rod also moves in a seal 46 which prevents leakage from the main portion into the main reservoir on down strokes. Significant fluid pressure may also be exerted on this seal on down strokes and so it is also important that this seal does not leak. Nevertheless, any leakage simply enters the main reservoir 22 and produces a fluid level increase in the secondary reservoir. Thus, no external leakage from the cylinder, as a whole, can occur.

Thus, it will be observed that any leakage through the seals from the piston chamber 18 is restricted to a closed fluid supply or circulating system, consisting of the main fluid reservoir 22, the secondary reservoir 24 and the supply line 32. Except for vent path through space 26, the system is completely closed. Since no external leakage of fluid can take place, there is never a need to refill the cylinder; moreover, if there is any air in the fluid, it is vented out of the system and, as this happens, head pressure of the secondary reservoir replenishes the fluid in the piston chamber, which is thus kept completely filled and air free at all times.

The weep holes obviously should be small in order to avoid significant fluid leakage therethrough during piston movement in either direction (up or down) when significant fluid pressurization may occur in the chamber, since such leakage may deteriorate the operation of the damper.

The present invention has been described as embodied in one type actuator. In this actuator the piston rod extends from the piston chamber into the main reservoir which, as described, produces fluid displacement into the secondary reservoir and fluid return when the piston rod displacement is reduced in the main reservoir. In this way the upper seals 34, 36 and the lower seal 46 are always immersed in fluid. It will be obvious to one skilled in the art, however, that the lower end of the piston rod may be eliminated and instead the lower portion 44 may be directly connected to the secondary reservoir, thus forming an integral main reservoir. This type of arrangement clearly eliminates the lower seal 46, but still provides for the automatic replenishment of fluid in the secondary reservoir, lubrication of the seal therein and the air venting action, as previously described. In this arrangement the piston itself pumps the fluid into the secondary reservoir, whereas in the actuator 10 the pumping action is achieved principally due to the increased displacement of the piston rod end 30.

The foregoing is a detailed description of an exemplary embodiment of the present invention and may suggest to one skilled in the art various modifications, omissions, additions, therein and thereto, embracing the true scope and spirit of the invention set forth in the claims that follow.

We claim:
1. A hydraulic cylinder characterized by:
a piston;
a piston rod attached to said piston;
a fluid fillable cylinder having a first fluid supply reservoir at one end and a second fluid supply reservoir which is vented to ambient and located above said first reservoir, at a second, opposite end of the cylinder; said reservoirs being in fluid connection with each other, and said piston being slidably disposed in said cylinder, dividing it into two fluid fillable chambers; one of said chambers being in fluid connection with said second reservoir and the other of said chambers being in fluid connection with the first of said reservoirs; and said piston rod extending into said first reservoir for displacing fluid therefrom into the other of said reservoirs, as the piston moves towards said one end.

* * * * *